Dec. 26, 1944.    J. JANDASEK    2,365,879
TRANSMISSION
Filed Sept. 8, 1941
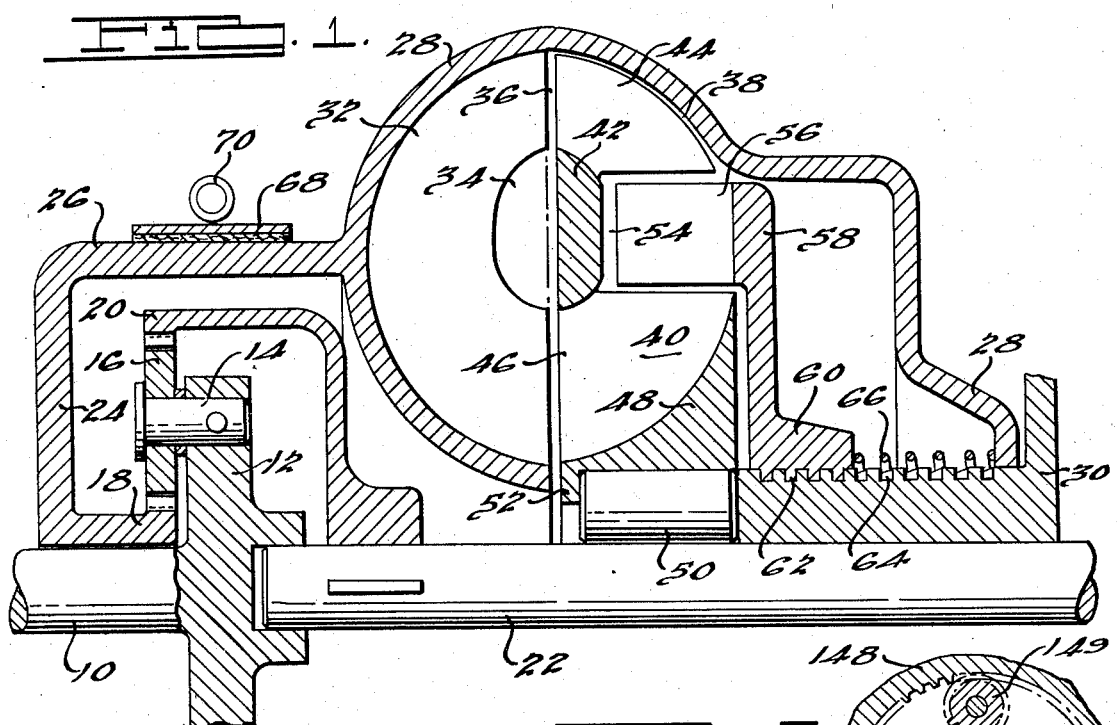
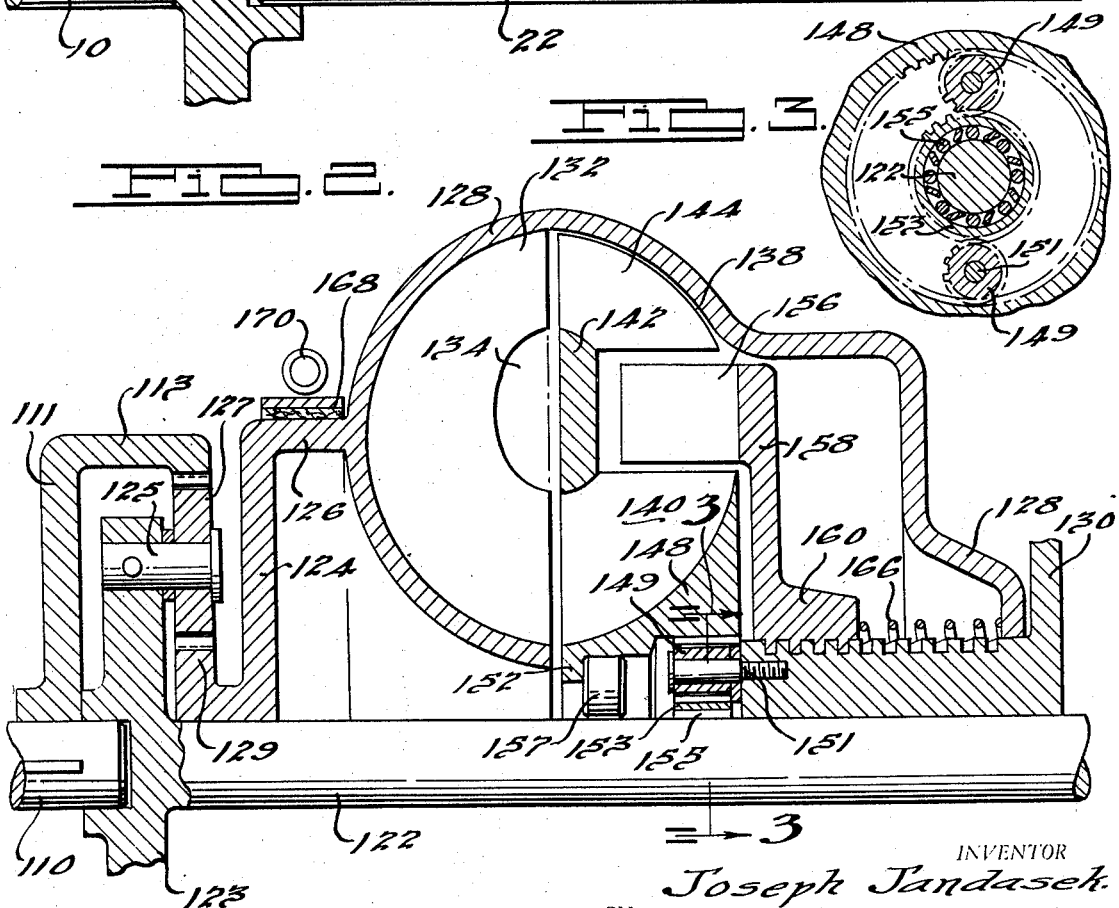
INVENTOR
Joseph Jandasek.
BY
Gray & Smith.
ATTORNEYS.

Patented Dec. 26, 1944

2,365,879

UNITED STATES PATENT OFFICE 2,365,879

TRANSMISSION

Joseph Jandasek, Detroit, Mich., assignor to Bendix Aviation Corporation, South Bend, Ind., a corporation of Delaware Application September 8, 1941, Serial No. 410,001

8 Claims. (Cl. 74—189.5)

This invention relates to transmissions and more particularly to power transmitters of the type wherein a portion of the power may be transmitted from a driving shaft to a driven shaft through a fluid transmission and the remainder of the power may be transmitted through mechanical gearing.

It is desirable where high torque is required in the operation of transmissions that means be provided for the transmission of power through both a fluid and a mechanical transmission. It is also desirable that means be provided to eliminate the dual power transmitting paths under certain conditions of operation to eliminate frictional losses incident to the use of the dual circuit particularly at high speeds.

An object of this invention is therefore to provide a transmission having a mechanical and a fluid transmission operative simultaneously at low speeds and wherein means are provided to render the fluid transmission inoperative at high speeds to transmit power from a driving shaft to a driven shaft through the mechanical transmission only.

Another object of the invention resides in the provision of a fluid transmission interposed between driving and driven shafts and operable to transmit power from the driving shaft to the driven shaft as a torque converter at relatively low speeds where torque multiplication is desired, and operable to transmit power to the driven shaft as a fluid coupling where substantially no torque multiplication is desired, and wherein means are provided to render the fluid transmission inoperative at still higher speed thereby to eliminate frictional losses incident to the operation of the turbo unit.

A still further object is to provide a mechanical power transmitting device having means to drive a fluid transmission at varying speeds dependent on the relation of the speed of the driven shaft to the speed of the driving shaft to transmit a portion of the power applied by the driving shaft to the driven shaft through the transmission.

Still a further object of the invention resides in the provision of a mechanical gear transmission having spaced ring and sun gears, one secured to a driving shaft and the other connected to drive a fluid transmission to transmit power to a driven shaft and wherein means are provided to lock the fluid transmission against rotation to operate the mechanical gear transmission at an overdrive speed.

Yet a still further object resides in the provision of a power transmitting mechanism including a fluid and a mechanical transmission interposed between a driving shaft and a driven shaft in such a manner that one element of the mechanical transmission may be employed to selectively drive the fluid transmission to transmit power from the driving shaft to the driven shaft under varying torque conditions and wherein means are provided to render the fluid transmission inoperative to transmit power through the mechanical transmission at overdrive speeds.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a longitudinal sectional view illustrating one embodiment of the invention.

Fig. 2 is a longitudinal sectional view illustrating a somewhat modified form of the invention.

Fig. 3 is a sectional view taken substantially on the line 3—3 of Fig. 2, looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to Fig. 1, it will be observed that a driving shaft 10 has a radially extended flange 12. The shaft may be driven from any suitable source of power. The flange 12 is provided with a plurality of spaced stub shafts 14 having pinion gears 16 in mesh with a sun gear 18 and a ring gear 20. The ring gear 20 is mounted on a driven shaft 22 preferably aligned with the driving shaft 10. The sun gear 18 is preferably connected through a radially extended flange 24 and an axially extended drum 26 to a rotatable housing 28 mounted concentrically with relation to a stationary member 30 embracing the driven shaft 22.

The housing 28 is provided with a plurality of spaced impeller blades 32 secured to a shroud 34. The blades 32 are of suitable configuration to impart energy to fluid circulating in a power transmitting fluid circuit 36.

A turbine preferably having first and second stage turbine channels 38 and 40 is aligned with the outlet from the impeller and the entrance thereto respectively. The first and second stage turbine passages have therein vanes 44 and 46 carried by a shroud 42 and adapted to absorb energy from the fluid circulating in the power transmitting fluid circuit 36.

The turbine vanes 46 are secured to a hub 48 mounted on the driven shaft 22 with a one-way driving means 50 interposed therebetween. The one-way driving means 50 may be interposed between a flange 52 on the hub 48 and the stationary member 30. The one-way driving means 50 is preferably provided with alternately spaced roller and cam members adapted to exert a wedging action between the driven shaft 22 and the hub 48 to transmit a driving force to the driven shaft 22 when the hub 48 is rotated in one direction. When the hub 48 rotates in the opposite direction relative to the driven shaft 22, the cam members assume an inoperative position and the rollers of the one-way driving means 50 permit the hub to rotate freely on the driven shaft 22.

A guide wheel channel 54 is interposed between the first and second stage turbine channels 38 and 40. Guide wheel vanes 56 of suitable angular inclination are carried by a web 58 mounted on a guide wheel hub 60 axially movable on the stationary member 30. The guide wheel vanes 56 are designed with suitable curvatures and angles of inclination determined in accordance with the viscosity of the fluid employed, the speed at which the turbo unit operates, the temperature of operation, the power to be transmitted and other factors to produce a desired reactionary force to enable energy to be absorbed from the circulating fluid by the turbine vanes 44 and 46 with a desired degree of torque multiplication accompanied by a reduction in the speed of rotation.

The guide wheel hub 60 has helical threads 62 adapted to receive helical threads 64 on the stationary member 30 so that the guide wheel member may shift axially on the stationary member to introduce the guide wheel vanes 56 into the guide wheel channel 54 of the power transmitting fluid circuit 36 to operate the device as a torque converter, or to withdraw the guide wheel vanes 56 from the fluid circuit 36 to operate the device as a fluid coupling.

The position of the guide wheel member relative to the power transmitting fluid circuit is determined by fluid reaction in the circuit and by an axially extended spring 66 interposed between the housing 28 and the hub 60. The position of the guide wheel relative to the power transmitting fluid circuit will also be influenced by the drag of the rotating fluid on the guide wheel web 58. This variable is frequently referred to as the disk friction exerted on a member suspended in fluid and rotatable relative thereto.

Means may be provided to render the fluid transmission unit inoperative whereby power may be transmitted from the driving shaft to the driven shaft through planetary gearing. One desirable form of such means comprises a brake band 68 operable by a power unit 70 to engage the drum 26 of the housing 28 to lock the impeller 28 and the sun gear 18 against rotation.

The operation of this device is as follows:

When power is applied to the driving shaft 10 with the driven shaft 22 stationary, rotative energy is transmitted through the flange 12, stub shafts 14, pinions 16, sun gear 18, flange 24, drum 26 and housing 28 to energize fluid in the power transmitting fluid circuit 36 by rotation of the impeller blades 32. The spring 66 together with other forces acting on the guide wheel vanes 56 retains the vanes in an operative position in the fluid circuit as illustrated. Energized fluid flows from the impeller channel to the first stage turbine channel 38, through the guide vanes 56 to the second stage turbine channel 40 whereupon energy is absorbed by the turbine. The energy absorbed by the turbine is transmitted through the hub 48 and one-way driving means 50 to exert a driving force on the driven shaft 22 to rotate the driven shaft 22 in the direction of the driving shaft 10.

As the speed of rotation of the driven shaft 22 increases, due to differential in speed between the sun gear 18 and the ring gear 20, a portion of the power applied by the driving shaft is transmitted from the pinions 16 to the ring gear 20 connected to the driven shaft 22. The remaining power is transmitted through the sun gear 18 to the impeller 28. As the ratio between the speed of the driven shaft 22 relative to the speed of the driving shaft 10 varies, the proportion of the power transmitted through the mechanical gearing and through the fluid transmission varies.

The guide wheel vanes 56 are preferably designed in such a manner that the forces acting thereon will induce the guide wheel member to shift axially out of the power transmitting fluid circuit 36 as the speed of the driven shaft 22 approaches the speed of the driving shaft 10. The fluid transmission then ceases operating as a torque converter and begins operating as a fluid coupling to transmit power to the driven shaft 22 at high efficiency but with substantially no multiplication of torque.

As the speed of the driven shaft 22 still further approaches the speed of the driving shaft 10, the brake band 68 may be actuated to engage the drum 26 to lock the housing 28 and the sun gear 18 against rotation to render the fluid transmission inoperative and to transmit power through the pinions 16 and ring gear 20 to the driven shaft 22 at overdrive speed. The one-way driving means 50 permits the driven shaft 22 to rotate freely relative to the turbine hub 48 and since the impeller is locked against rotation the fluid transmission becomes inoperative and does not absorb any energy. All of the power is then transmitted from the driving shaft 10 to the driven shaft 22 at overdrive speed.

The embodiment of the invention illustrated in Fig. 2 is similar in many respects to the embodiment illustrated in Fig. 1. Corresponding parts have therefore been given corresponding reference numerals with the addition of 100.

A driving shaft 110 has a flange 111 which supports a ring gear 113 and a driven shaft 122 has a flange 123 supporting suitable stub shafts 125 having mounted thereon pinions 127. A sun gear 129 on a flange 124 of a drum on a rotatable housing 128 meshes with the pinions 127.

The operation of this embodiment of the invention is similar to the operation of the embodiment of Fig. 1 with the exception that when the driven shaft 122 is stationary and power is applied by the driving shaft 110, the ring gear 113 rotates the pinions 127 to drive the sun gear 129 and the housing 128 to drive the impeller of the fluid transmission at a speed considerably in excess of the speed of rotation of the driving shaft 110.

As the driven shaft 122 speeds up to a substantially predetermined speed relative to the driving shaft 110, the guide wheel vanes 156 are retracted from the power transmitting fluid circuit 136 to operate the device as a fluid coupling.

When the driven shaft 122 still further approaches the speed of the driving shaft 110, the brake band 168 is actuated by the power unit 170 to lock the drum 126 against rotation whereupon energy is transmitted mechanically from the ring gear 113 through the pinions 127, stub shaft 125, flange 123 to the driven shaft 122 at a suitable speed depending upon the gear ratios employed.

It will be noted that when the fluid transmission is operating, energy is transmitted from the turbine through the hub 148 to the driven shaft 122 through spaced pinions 149 mounted on stub shafts 151 carried by the stationary member 130. The pinions 149 mesh with a sun gear 153 on the driven shaft 122 with a one-way driving means 155 interposed therebetween. A bearing 157 may be interposed between the hub 148 and the driven shaft 122.

The ratio of the sun and ring gears operatively connected with the shafts may of course be varied to provide any desired distribution of power between the mechanical and turbo-units.

The operation of the device is such that when initially operated virtually all of the power is transmitted through the fluid transmission. As the speed of rotation of the driven shaft increases with reference to the speed of rotation of the driving shaft, the proportion of power transmitted through the mechanical transmission increases and the ratio of the power transmitted through the fluid transmission decreases.

I claim:

1. A transmission comprising a driving shaft, a driven shaft, planetary gearing connecting the shafts, an impeller and a turbine cooperating to form a power transmitting fluid circuit, speed changing and one-way driving means between the turbine and the driven shaft to rotate the driven shaft at a fixed speed ratio between the speeds of rotation of the turbine and driven shaft speeds, said speed changing and one-way driving means being so constructed and arranged that as the turbine is driven by the impeller power may be transmitted from the turbine to the driven shaft and whereby the driven shaft may rotate freely within the turbine member at a speed of rotation in excess of the speed of rotation of the turbine, and means connecting the planetary gearing to the impeller whereby the impeller may be driven by the driving shaft, braking means associated with the impeller whereby the impeller may be locked against rotation to render the fluid transmission inoperative and to transmit the entire power from the driving shaft to the driven shaft through the planetary gearing.

2. In a transmission, a driving shaft, a driven shaft, planetary gearing including sun, pinion and ring gears connecting said shafts, a fluid transmission including an impeller and a turbine cooperating to form a power transmitting fluid circuit, said fluid transmission being mounted on said shafts, a reverse driving means between the turbine and the driven shaft, a stationary member supporting the driven shaft, a guide wheel member movable on the stationary member between an operative position in the power transmitting fluid circuit to operate the fluid transmission as a torque converter and an inoperative position out of the power transmitting fluid circuit to operate the fluid transmission as a fluid coupling, means connecting one element of the planetary gearing and the impeller whereby at low speed of operation of the driven shaft relative to the driving shaft a major portion of power is transmitted from the driving shaft to the driven shaft through the fluid transmission to the driven shaft with torque multiplication and whereby as the speed of rotation of the driven shaft increases relative to the speed of rotation of the driving shaft the guide wheel member of the fluid transmission shifts axially on the stationary member and assumes said inoperative position to transform the fluid transmission to operate as a fluid coupling to transmit power from the driving shaft to the driven shaft with virtually no torque multiplication, and means to lock the impeller against rotation to render the fluid transmission inoperative and to transmit power from the driving shaft to the driven shaft through the planetary gearing.

3. A transmission comprising driving and driven shafts, a fluid transmission including an impeller and a turbine cooperating to form a power transmitting fluid circuit, speed increasing one-way driving means between the turbine and the driven shaft whereby power may be transmitted from the turbine to the driven shaft at overdrive speed when the driven shaft tends to rotate at a speed slower than the speed of rotation at which the turbine tends to rotate, planetary gearing including pinions interposed between the driving and driven shafts whereby power may be transmitted directly from the driving shaft to the driven shaft, a sun gear in mesh with the pinions, means connecting the sun gear to the impeller, braking means to lock the sun gear and impeller against rotation to render the fluid transmission inoperative and to transmit power from the driving shaft to the driven shaft directly through the planetary gearing.

4. A transmission comprising a driving shaft, a driven shaft, planetary gearing between said shafts, a sun gear in mesh with the pinions of the planetary gearing, means to lock the sun gear against rotation to transmit power from the driving shaft to the driven shaft through the planetary gearing at an overdrive speed, a fluid transmission including an impeller and a turbine providing a power transmitting fluid circuit, a stationary member supporting the driven shaft, torque multiplying driving means between the turbine and the driven shaft whereby the energy imparted to the turbine may be transmitted to the driven shaft when the driven shaft tends to rotate at a speed slower than the speed at which the turbine tends to rotate, said one-way driving means being so constructed and arranged that when the sun gear is locked against rotation the driven shaft rotates freely within the turbine member.

5. A transmission comprising a driving shaft, a ring gear carried by the driving shaft, a driven shaft aligned with the driving shaft, pinions carried by the driven shaft and in mesh with the ring gear, a sun gear in mesh with the pinions, a fluid transmission including an impeller and a turbine member cooperating to form a powder transmitting fluid circuit, means connecting the sun gear to the impeller whereby the impeller may be driven by the sun gear to rotate at a speed in excess of the speed of rotation of the driving shaft, means to lock the impeller and sun gear against rotation to render the fluid transmission inoperative and to transmit power from the driving shaft to the driven shaft through the pinions and ring gear, and one-way reverse driving means between the turbine and the driven shaft whereby power may be transmitted to the driven shaft when the turbine is driven by the impeller.

6. In a transmission, a driving shaft, a ring gear carried by the driving shaft, a driven shaft, pinions carried by the driven shaft in mesh with the ring gear, a sun gear in mesh with the pinions, a fluid transmission including an impeller and a turbine cooperating to form a power transmitting fluid circuit, means connecting the sun gear to the impeller whereby the impeller may be driven by the sun gear, means to lock the impeller and sun gear against rotation to render the fluid transmission inoperative and to transmit power from the driving shaft to the driven shaft through the pinions and ring gear, and means interposed between the turbine and the driven shaft to rotate the driven shaft at a fixed speed ratio between the turbine and the driven shaft speeds whereby power may be transmitted to the driven shaft when the turbine is driven by the impeller.

7. A transmission comprising driving and driven shafts, two paths of power flow between said shafts, one of said paths comprising a fluid transmission having impeller and turbine members cooperating to form a power transmitting fluid circuit, and torque increasing and one-way driving means between the turbine and the driven shaft.

8. A transmission comprising driving and driven shafts, two paths of power flow between said shafts, one of said paths comprising a fluid transmission including an impeller and a turbine rotatable in a direction opposite to the direction of rotation of the driving and driven shafts and cooperating to form a power transmitting fluid circuit, and reverse driving means between the turbine member and the driven shaft.

JOSEPH JANDASEK.